(12) United States Patent
Bryson et al.

(10) Patent No.: US 12,524,180 B2
(45) Date of Patent: Jan. 13, 2026

(54) EDGE SOLID STATE DRIVE (SSD) DEVICE AND EDGE DATA SYSTEM

(71) Applicant: Samsung Electronics Co., Ltd., Suwon-si (KR)

(72) Inventors: Matthew S. Bryson, Los Gatos, CA (US); Sompong Paul Olarig, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 16/994,552

(22) Filed: Aug. 14, 2020

(65) Prior Publication Data

US 2021/0389909 A1 Dec. 16, 2021

Related U.S. Application Data

(60) Provisional application No. 63/039,980, filed on Jun. 16, 2020.

(51) Int. Cl.
*G06F 3/06* (2006.01)
*H04B 1/38* (2015.01)
(Continued)

(52) U.S. Cl.
CPC .......... *G06F 3/0659* (2013.01); *G06F 3/0604* (2013.01); *G06F 3/0679* (2013.01);
(Continued)

(58) Field of Classification Search
CPC .... G06F 3/0604; G06F 3/0659; G06F 3/0679; H04B 1/38; H04W 4/38; H04W 4/70; H04W 84/18
See application file for complete search history.

(56) References Cited

U.S. PATENT DOCUMENTS

| 9,378,763 B1 * | 6/2016 | Kim .................... G11B 5/54 |
| 10,554,507 B1 | 2/2020 | Siddiqui et al. |

(Continued)

FOREIGN PATENT DOCUMENTS

| CN | 1599347 A | 3/2005 |
| CN | 109863734 A | 6/2019 |
| KR | 20190012093 A | 2/2019 |

OTHER PUBLICATIONS

M. Lohstroh, H. Kim, J. C. Eidson, C. Jerad, B. Osyk and E. A. Lee, "On Enabling Technologies for the Internet of Important Things," in IEEE Access, vol. 7, pp. 27244-27256, 2019, doi: 10.1109/ACCESS.2019.2901509. (Year: 2019).*

(Continued)

*Primary Examiner* — Eric T Oberly
(74) *Attorney, Agent, or Firm* — Renaissance IP Law Group LLP

(57) ABSTRACT

Various aspects include an edge SSD device. The edge SSD device includes non-volatile memory circuits. The edge SSD device includes one or more memory controllers to operate the non-volatile memory circuits. The edge SSD device includes wireless transceivers. The edge SSD device includes a data processor configured to aggregate data received from remote sensor devices using the wireless transceivers into aggregated data. The data processor may process and/or filter the aggregated data into processed and/or filtered data, and may cause the aggregated data to be stored by the one or more memory controllers to the volatile memory circuits. The data processor may cause the processed and/or filtered data to be transmitted using the wireless transceivers.

20 Claims, 9 Drawing Sheets

(51) Int. Cl.
  *H04W 4/38* (2018.01)
  *H04W 4/70* (2018.01)
  *H04W 84/18* (2009.01)

(52) U.S. Cl.
  CPC ............... *H04B 1/38* (2013.01); *H04W 4/38* (2018.02); *H04W 4/70* (2018.02); *H04W 84/18* (2013.01)

(56) References Cited

U.S. PATENT DOCUMENTS

| | | | |
|---|---|---|---|
| 10,715,411 B1* | 7/2020 | Jacob Da Silva | H04L 67/566 |
| 2005/0057370 A1* | 3/2005 | Warrior | H04W 52/0216 |
| | | | 455/11.1 |
| 2007/0268128 A1* | 11/2007 | Swanson | H04Q 9/00 |
| | | | 340/539.22 |
| 2011/0264663 A1* | 10/2011 | Verkasalo | G06F 9/455 |
| | | | 707/E17.014 |
| 2012/0026890 A1 | 2/2012 | Banka et al. | |
| 2012/0197856 A1 | 8/2012 | Banka et al. | |
| 2013/0227703 A1* | 8/2013 | Sotos | G06F 21/78 |
| | | | 726/26 |
| 2014/0222522 A1 | 8/2014 | Chait | |
| 2015/0237122 A1* | 8/2015 | Wang | H04L 67/025 |
| | | | 709/227 |
| 2016/0064036 A1* | 3/2016 | Chen | G06F 21/79 |
| | | | 386/241 |
| 2016/0179749 A1* | 6/2016 | Lynch | G01C 21/32 |
| | | | 708/400 |
| 2017/0206782 A1* | 7/2017 | Asai | G08G 1/0112 |
| 2017/0286497 A1 | 10/2017 | Crabtree et al. | |
| 2018/0146058 A1* | 5/2018 | Somayazulu | H04L 67/63 |
| 2018/0232904 A1* | 8/2018 | Zakharevich | G06T 7/97 |
| 2018/0239540 A1 | 8/2018 | Kachare et al. | |
| 2018/0284990 A1* | 10/2018 | Kachare | G06F 3/0631 |
| 2018/0288152 A1* | 10/2018 | Chagam Reddy | G06F 3/0635 |
| 2018/0336144 A1 | 11/2018 | Olarig et al. | |
| 2018/0342039 A1 | 11/2018 | Kachare et al. | |
| 2018/0359318 A1 | 12/2018 | Rogers et al. | |
| 2019/0044726 A1 | 2/2019 | Macieira et al. | |
| 2019/0045001 A1* | 2/2019 | Mankovskii | G06F 21/50 |
| 2019/0049958 A1 | 2/2019 | Liu et al. | |
| 2019/0147092 A1 | 5/2019 | Pal et al. | |
| 2019/0163665 A1 | 5/2019 | Kachare et al. | |
| 2019/0190802 A1* | 6/2019 | Jalali | H04L 67/1042 |
| 2019/0272021 A1 | 9/2019 | Olarig et al. | |
| 2019/0291642 A1 | 9/2019 | Chae et al. | |
| 2020/0049677 A1* | 2/2020 | Sayfan | G01N 33/0075 |
| 2020/0160207 A1 | 5/2020 | Song et al. | |
| 2020/0186383 A1 | 6/2020 | Sebastian et al. | |
| 2020/0410322 A1* | 12/2020 | Naphade | G06N 3/044 |
| 2021/0173560 A1* | 6/2021 | Choi | G06F 3/0604 |
| 2021/0201666 A1* | 7/2021 | Pelleg | G08G 1/0133 |

OTHER PUBLICATIONS

Office Action for European Application No. 21165635.0, mailed Jan. 27, 2023.

* cited by examiner

EDGE SOLID STATE DRIVE (SSD) DEVICE AND EDGE DATA SYSTEM

RELATED APPLICATION DATA

This application claims the benefit of U.S. Provisional Application Ser. No. 63/039,980, filed on Jun. 16, 2020, which is hereby incorporated by reference.

TECHNICAL AREA

The present disclosure relates to storage and networking systems, and more particularly, to an edge solid state drive (SSD) device and an edge data processing and/or filtering system including a peer-to-peer (P2P) network of sensors.

BACKGROUND

SSDs are usually installed in computers and mobile devices. In larger installations, SSDs are used in rack-mounted systems. The Internet Of Things (IoT) is growing. Tens of billions of devices are now interconnected over the IoT. The growth of such interconnected devices shows no signs of slowing. Gathering and processing the data that is generated by these devices is a challenge. While some SSDs are configured to store data that is gathered from the IoT, the SSDs have a single function of storing the information. In addition, limitations such as cost, power, latency, bandwidth, and the overall amount of information involved hold back the growth, and impede many of the benefits that could otherwise be realized from the expansion of the Internet.

BRIEF SUMMARY

Various embodiments of the disclosure include an edge SSD device. The edge SSD device may include one or more non-volatile memory circuits. The edge SSD device may include one or more memory controllers configured to operate the one or more non-volatile memory circuits. The edge SSD device may include one or more wireless transceivers. The edge SSD device may include a data processor configured to aggregate data received from a first remote sensor device and a second remote sensor device using the one or more wireless transceivers into aggregated data. In some embodiments, the data processor may be further configured to process or filter the aggregated data, to cause the aggregated data to be stored by the one or more memory controllers to the one or more non-volatile memory circuits, and to cause the processed or filtered data to be transmitted using the one or more wireless transceivers.

Some embodiments may include an edge data system. The edge data system may include a first remote sensor device configured to gather data of a first type. The edge data system may include a second remote sensor device configured to gather data of a second type different from the first type. The edge data system may include an edge SSD device. The edge SSD device may include one or more non-volatile memory circuits. The edge SSD device may include one or more memory controllers configured to operate the one or more non-volatile memory circuits. The edge SSD device may include one or more wireless transceivers. The edge SSD device may include a data processor configured to receive the data of the first type from the first remote sensor device using the one or more wireless transceivers, and to receive the data of the second type from the second remote sensor device using the one or more wireless transceivers. In some embodiments, the data processor may further be configured to aggregate the data of the first type and the data of the second type, to process or filter the aggregated data, to cause the aggregated data to be stored by the one or more memory controllers to the one or more non-volatile memory circuits, and to cause the processed or filtered data to be transmitted using the one or more wireless transceivers.

Some embodiments may include a computer-implemented method for gathering, processing, and/or filtering edge data. The method may include controlling, by one or more memory controllers, one or more non-volatile memory circuits of an edge solid state drive (SSD) device. The method may include receiving, by one or more wireless transceivers of the edge SSD device, data from a first remote sensor device and a second remote sensor device. The method may include aggregating, by the edge SSD device, the data from the first remote sensor device and the second remote sensor device into aggregated data. The method may include storing, by the one or more memory controllers, the aggregated data to the one or more non-volatile memory circuits. The method may include processing or filtering, by the edge SSD device, the aggregated data. The method may include transmitting, by the edge SSD device, the processed or filtered data.

BRIEF DESCRIPTION OF THE DRAWINGS

The foregoing and additional features and advantages of the present disclosure will become more readily apparent from the following detailed description, made with reference to the accompanying figures, in which.

DETAILED DESCRIPTION

Figure 1:
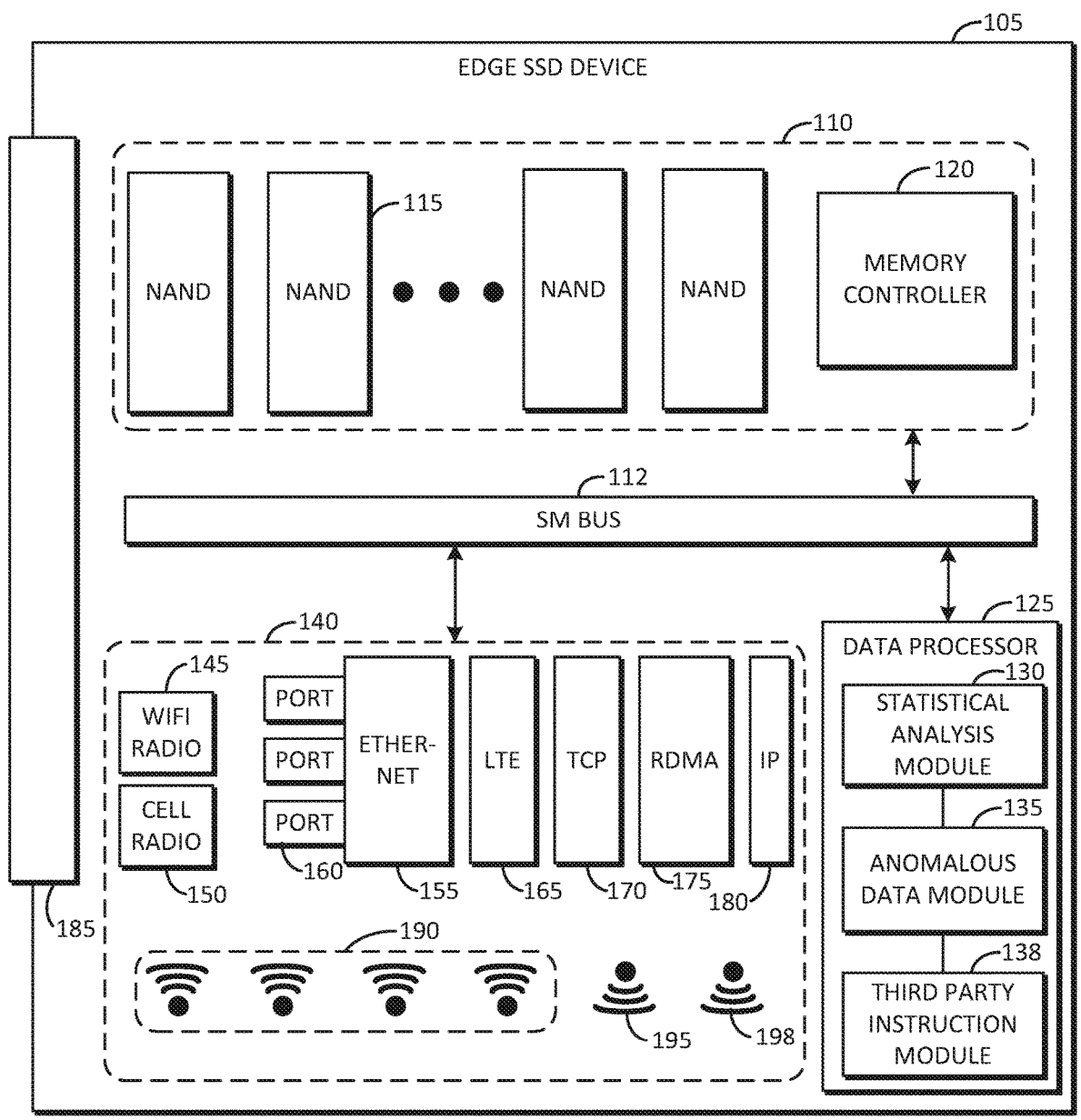
FIG. 1 illustrates a block diagram of an edge SSD device in accordance with some embodiments.

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first sensor could be termed a second sensor, and, similarly, a second sensor could be termed a first sensor, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Gathering and processing large amounts of data generated by sensors on the edge of a network such as the Internet or a local network is a challenge. Transmitting such large amounts of data is prohibitive due to network bandwidth limitations, cost barriers, power consumption, transmission latency, or the like. Nevertheless, the IoT continues to expand, along with the overall number of devices and sensors associated with the Internet and other networks. Such expansion threatens the ability to gather, process, and transmit the data that is generated.

Embodiments disclosed herein include an edge SSD device and an edge data system including a P2P network of sensors. The edge SSD device can communicate over wireless networks, and can aggregate multiple sources of data from remote sensors and other data sources. The edge SSD device can be used in connection with a variety of applications, such as edge computing, the IoT, home automation, 4G and/or 5G networking, and in datacenters.

An edge data system disclosed herein can incorporate one or more edge SSD devices and remote IoT sensors to gather, store, and disseminate data from the edge of a network, while reducing cost, power, latency, and bandwidth. The one or more edge SSD devices can use one or more short to medium range wireless transceivers such as WiFi or Bluetooth® transceivers to communicate with sensors near an edge of a network. The one or more edge SSD devices can use one or more long range wireless transceivers such as a cellular transceiver to communicate with the broader Internet. Alternatively, the one or more edge SSD devices can use a wired connection such as an Ethernet connection to communicate with the broader Internet.

Figure 2:
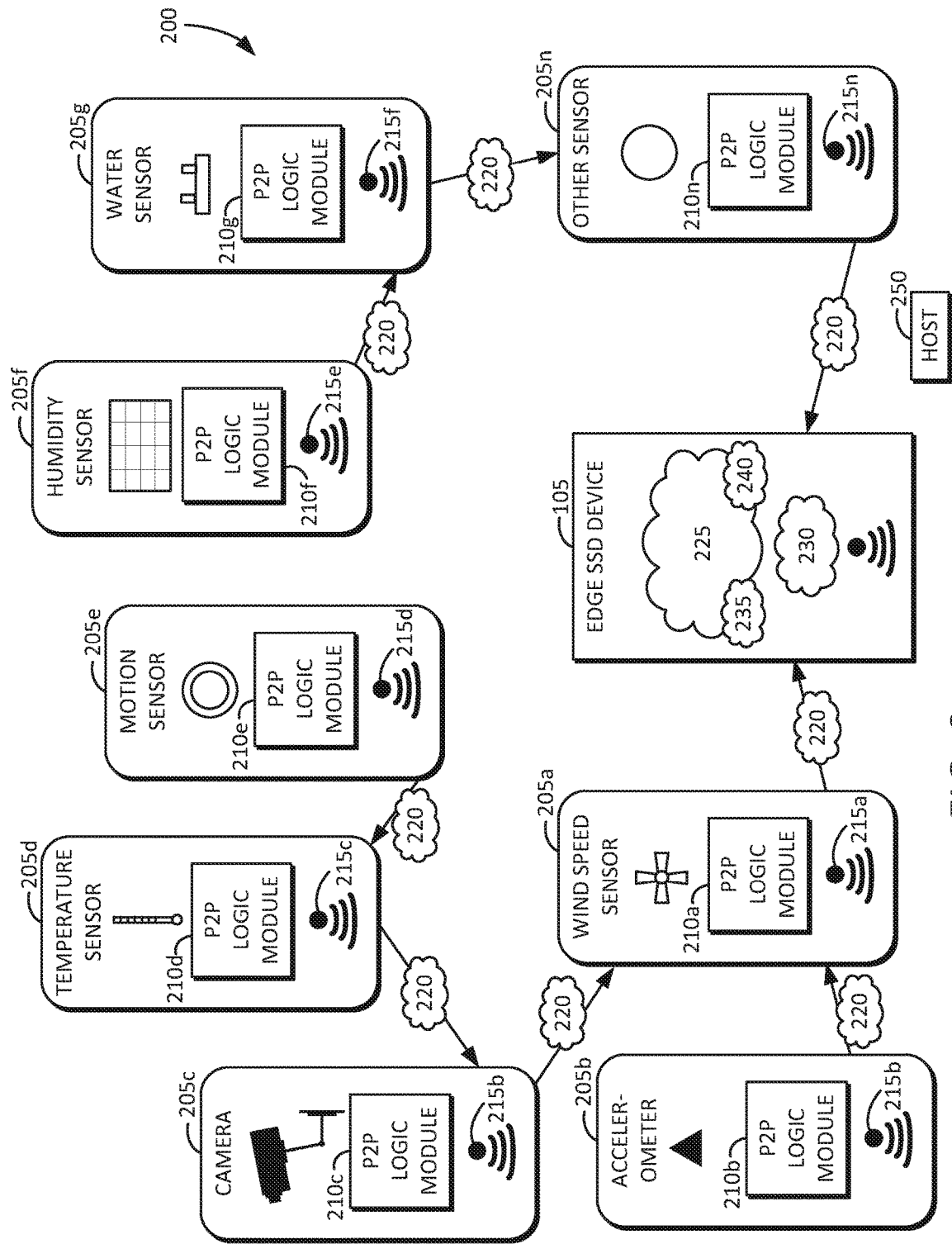
FIG. 2 illustrates a block diagram of an edge data system including the edge SSD device of FIG. 1 and remote sensor devices configured in a P2P network in accordance with some embodiments.
Figure 3:
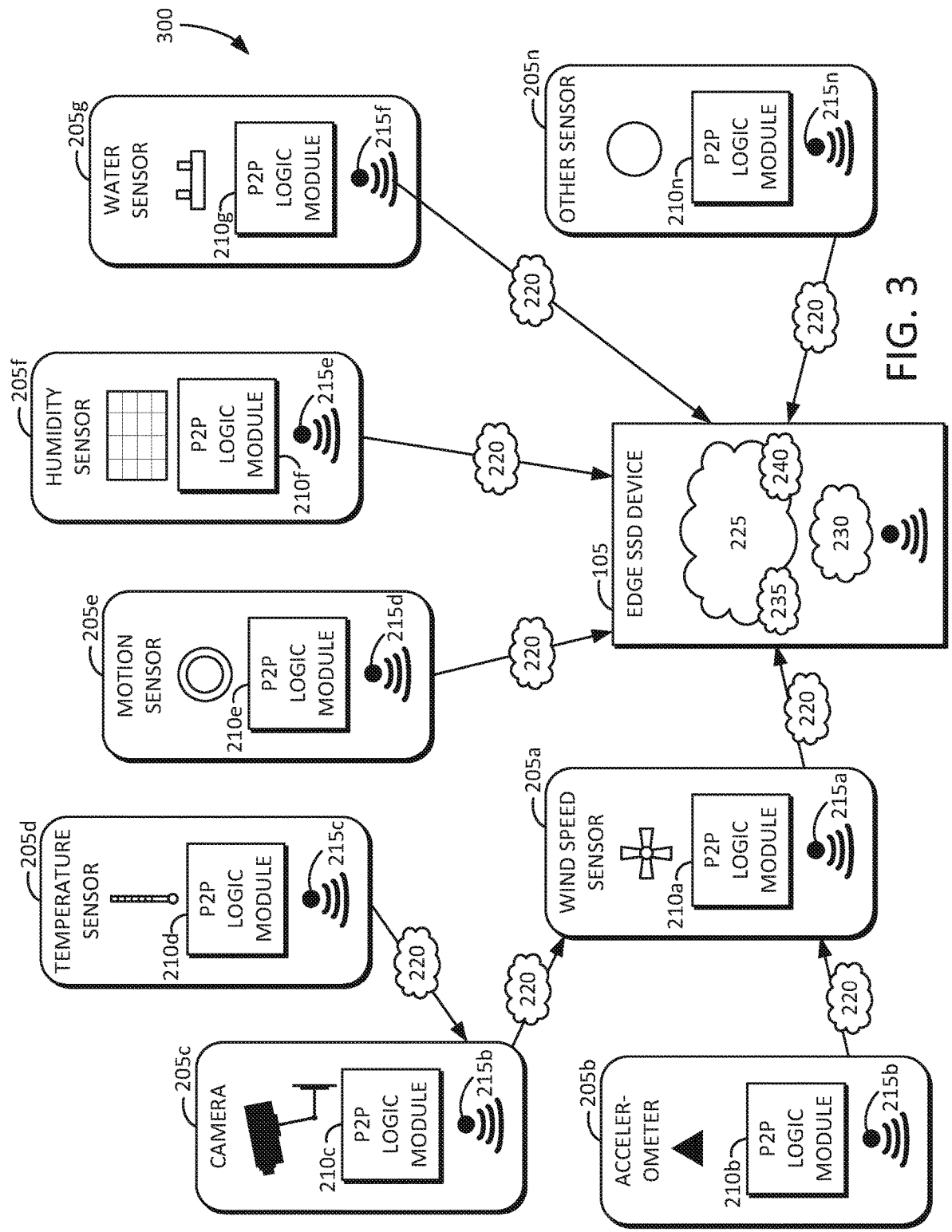
FIG. 3 illustrates a block diagram of another edge data system including the edge SSD device of FIG. 1 with a different P2P configuration of remote sensor devices in accordance with some embodiments.

FIG. 1 illustrates a block diagram of an edge SSD device 105 in accordance with some embodiments. FIG. 2 illustrates a block diagram of an edge data system 200 including the edge SSD device 105 of FIG. 1 and remote sensor devices (e.g., 205a through 205n) configured in a P2P network in accordance with some embodiments. FIG. 3 illustrates a block diagram of another edge data system 300 including the edge SSD device 105 of FIG. 1 with a different P2P configuration of remote sensor devices (e.g., 205a through 205n) in accordance with some embodiments. Reference is now made to FIGS. 1, 2, and 3.

The edge SSD device 105 can be a standalone device having wireless networking capabilities. In some embodiments, the edge SSD device 105 can be deployed as a standalone device at an edge of a network. In some embodiments, the edge SSD device 105 can be connected to a host 250 via a standard connector such as PCIe or U.2. The edge SSD device 105 can include an SSD 110, which includes one or more non-volatile memory circuits (e.g., 115) and one or more memory controllers 120. The one or more memory controllers 120 can operate the one or more non-volatile memory circuits (e.g., 115). The one or more non-volatile memory circuits (e.g., 115) can be NAND memory circuits, for example. It will be understood that other suitable types of non-volatile memory circuits can be included in the SSD 110.

The edge SSD device 105 can include one or more wireless transceivers (e.g., 190, 195, 198). The edge SSD device 105 can further include a data processor 125 to aggregate data 220 received from remote sensor devices (e.g., 205a through 205n) using the one or more wireless transceivers (e.g., 190, 195, 198) into aggregated data 225. In some embodiments, the data processor 125 includes a microprocessor. In some embodiments, the data processor 125 includes field programmable gate array (FPGA) logic. In some embodiments, the data processor 125 includes an application specific integrated circuit (ASIC). In some embodiments, the data processor 125 includes a co-processor. In some embodiments, the data processor 125 includes a complex programmable logic device (CPLD). It will be understood that the edge SSD device 105 can include any suitable device to facilitate the processing of data. The data processor 125 can process and/or filter the aggregated data 225 into processed and/or filtered data 230, and can cause the aggregated data 225 to be stored by the one or more memory controllers 120 to the one or more non-volatile memory circuits (e.g., 115). Accordingly, the aggregated data 225 may be preserved on the SSD 110. The data processor 125 can add together values from the aggregated data 225 that is stored. The data processor 125 can multiply together values from the aggregated data 225 that is stored. The data processor 125 can transform values from the aggregated data 225 that is stored. The data processor 125 can cause the processed and/or filtered data 230 to be transmitted using the one or more wireless transceivers (e.g., 190, 195, 198), as further described below. Accordingly, information having a specific use can be provided beyond the edge of a network, while bandwidth load on networks and remote servers in the cloud can be reduced. The information having a specific use can include, for example, anomalous data, erroneous data, a summary of data, a trigger event associated with data, a threshold level associated with data, a range of data, values that are added together, or the like. In addition, the processed and/or filtered data 230 can be stored and preserved on the SSD 110. The one or more transceivers (e.g., 190, 195, 198) can include a first transceiver (e.g., 190) to communicate with remote sensor devices (e.g., 205*a* through 205*n*), and a second transceiver (e.g., 195, 198) configured to communicate with the Internet.

The data processor 125 can include an anomalous data module 135, which can find anomalous data 235 within the aggregated data 225. The anomalous data 235 can include erroneous data or data outside of a predefined set of parameters. For example, the anomalous data 235 can include, an image of a human face or an image of a particular object. By way of further examples, the anomalous data 235 can include particular data of interest such as a particular interesting frame within a series of images, a particular temperature from among a series of temperature readings, a particular kind of movement of an object that is detected, or the like. The data processor 125 can cause the anomalous data 235 to be transmitted using the one or more wireless transceivers (e.g., 190, 195, 198). By transmitting the anomalous data 235 rather than all of the aggregated data 225, the edge SSD device 105 can reduce the amount burden placed on network devices and networks. For example, fewer network components may be needed, power can be reduced and conserved, transmission latencies can be improved, and the like.

The data processor 125 can include a statistical analysis module 130, which can perform a statistical analysis on the aggregated data 225, and can generate a statistical summary 240 of at least some of the aggregated data 225. The data processor 125 can cause the statistical summary 240 to be transmitted using the one or more wireless transceivers (e.g., 190, 195, 198). By transmitting the statistical summary 240 rather than all of the aggregated data 225, the edge SSD device 105 can reduce the bandwidth and throughput burdens placed on network devices and networks. For example, fewer network components may be needed, power can be reduced and conserved, transmission latencies can be improved, and the like.

The data processor 125 can include a third-party instruction module 138, which can receive and include one or more instructions from a third-party. The one or more instructions may relate to processing and/or filtering the aggregated data 225, preserving and providing the aggregated data 225, preserving and providing the anomalous data 235 associated with the aggregated data 225, preserving and providing the statistical summary 240 associated with the aggregated data 225, preserving and providing an additive summary of the aggregated data 225, preserving and providing a multiplied summary of the aggregated data 225, and/or performing other data transformations on the aggregated data 225 resulting in a reduction in data transmission, or the like.

The one or more wireless transceivers (e.g., 190, 195, 198) can include one or more WiFi transceivers (e.g., 190). The one or more WiFi transceivers can include multi-band WiFi N×N multiple-input-multiple-output (MIMO) transceivers, for example. The one or more wireless transceivers (e.g., 190, 195, 198) can include one or more cellular radio transceivers (e.g., 195 and 198). The one or more cellular radio transceivers (e.g., 195 and 198) can include one or more 4G transceivers (e.g., 195). The one or more cellular radio transceivers (e.g., 195 and 198) can include one or more 5G transceivers (e.g., 198). The one or more wireless transceivers (e.g., 190, 195, 198) can include two or more WiFi radio transceivers (e.g., 190). The one or more wireless transceivers (e.g., 190, 195, 198) can include two or more cellular radio transceivers (e.g., 195 and 198). The edge SSD device 105 can receive the data 220 from the remote sensor devices (e.g., 205*a* through 205*n*) using the one or more WiFi transceivers (e.g., 190). The edge SSD device 105 can aggregate data from the remote sensor devices (e.g., 205*a* through 205*n*) up the connection limits of WiFi, for example, up to 250 connections per WiFi transceiver on the edge SSD device 105. The edge SSD device 105 can transmit the processed and/or filtered data 230 using the one or more cellular transceivers (e.g., 195 and 198). The edge SSD device 105 can gather the data 220, aggregate, process, and/or filter the data 220, and transmit the processed and/or filtered data 230 incrementally. Accordingly, fewer cellular transceivers than WiFi transceivers may be needed.

The edge SSD device 105 can include a communication module 140. The communication module 140 can include the one or more transceivers (e.g., 190, 195, 198). The communication module 140 can include a WiFi radio module 145 to control the one or more WiFi transceivers (e.g., 190). The communication module 140 can include a cellular radio module 150 to control the one or more cellular transceivers (e.g., 195 and 198). The communication module 140 can include an ethernet module 155 having one or more ethernet ports (e.g., 160). The communication module 140 can include a wireless long term evolution (LTE) module 165, which can operate in conjunction with the cellular radio module 150 to control the one or more cellular transceivers (e.g., 195 and 198). The wireless LTE module 165 can support cellular phone wireless standards such as 4G and 5G. In some embodiments, the wireless LTE module 165 can support cellular phone wireless standards from 1G through NG, where N is an integer. The communication module 140 can include a transmission control protocol (TCP) module 170. The communication module 140 can include a remote direct access memory (RDMA) module 175, which can transfer data between the SSD 110 and the data processor 125, for example. The communication module 140 can include an Internet protocol (IP) module 180. The edge SSD device 105 can include a system management (SM) bus 112. The SM bus 112 can communicatively couple together the one or more memory controllers 120, the data processor 125, and the communication module 140. In some embodiments, the one or more WiFi radio transceivers (e.g., 190) may receive the data 220 from the remote sensor devices (e.g., 205*a* through 205*n*), and the ethernet module 155 may cause the processed and/or filtered data 230 to be transmitted over the one or more ethernet ports 160.

The edge SSD device 105 can include a standard power connector 185. The power connector 185 can be a U.2 power connector for example. By way of another example, the power connector 185 can be a power over Ethernet (POE) connector. In the case of using a POE connector, a lower amount of power mode may be provided, and power consumption may be reduced. In cases where the edge SSD device 105 may consume 25 Watts (W) or more of power, or thereabout, then the power connector 185 can be a connector other than the POE connector. It will be understood that any suitable power connector can be used. In a standalone configuration, the edge SSD device 105 may receive 12 Volts (V) direct current (DC) through power pins of the power connector 185. Because the aggregated data 225 may be locally analyzed, processed, and/or filtered into the filtered data 230, and less data may be transmitted by the edge SSD device 105, the edge SSD device 105 can consume less power, and therefore, power may be conserved. In an alternative embodiment, the edge SSD device 105 may be directly connected to a host 250.

The remote sensor devices (e.g., 205*a* through 205*n*) can include a wind speed sensor 205*a*, an accelerometer 205*b*, a camera 205*c*, or the like. The camera 205*c* may be a visible light camera, an infrared camera, a still image camera or a video camera, for example. The remote sensor devices (e.g., 205a through 205n) can further include a temperature sensor 205d, a motion sensor 205e, a humidity sensor 205f, a water sensor 205g, or other type of sensor 205n. Each of the remote sensor devices (e.g., 205a through 205n) can include a P2P module (e.g., 210a through 210n), respectively. Each of the remote sensor devices (e.g., 205a through 205n) can include a wireless transceiver (e.g., 215a through 215n), respectively. The wireless transceivers (e.g., 215a through 215n) may include a WiFi transceiver, for example. The P2P module may include logic to receive and forward data packets 220 between the remote sensor devices, or between a particular remote sensor device and the edge SSD device 105. Depending on a distance between a particular remote sensor device (e.g., 205e) and the edge SSD device 105, the remote sensor device (e.g., 205e) can either forward the data packets 220 through a neighboring remote sensor device (e.g., 205d) or forward the data packets 220 directly to the edge SSD device 105. Any particular data packet 220 may make multiple P2P hops through multiple remote sensor devices (e.g., 205a through 205n) before reaching the edge SSD device 105. Based on the particular remote sensor device (e.g., 205e) being located relatively close to the edge SSD device 105, the particular remote sensor device (e.g., 2053) may send the data 220 directly to the edge SSD device 105, as shown in FIG. 3. Based on the particular remote sensor device (e.g., 205e) being located relatively far away from the edge SSD device 105, the particular remote sensor device (e.g., 2053) may send the data 220 to a neighboring remote sensor device (e.g., 205d) instead, as shown in FIG. 2. The P2P module (e.g., 210e) of the particular remote sensor device (e.g., 205e) may determine whether to send the data to the neighboring remote sensor device (e.g., 205d) or directly to the edge SSD device 105 based on a distance between the particular remote sensor device (e.g., 205e) and the edge SSD device 105. Accordingly, the remote sensor devices (e.g., 205a through 205n) are each capable of transmitting data directly to the edge SSD device 105, or otherwise determining a routing path through other remote sensor devices to communicate with the edge SSD device 105.

Figure 4:
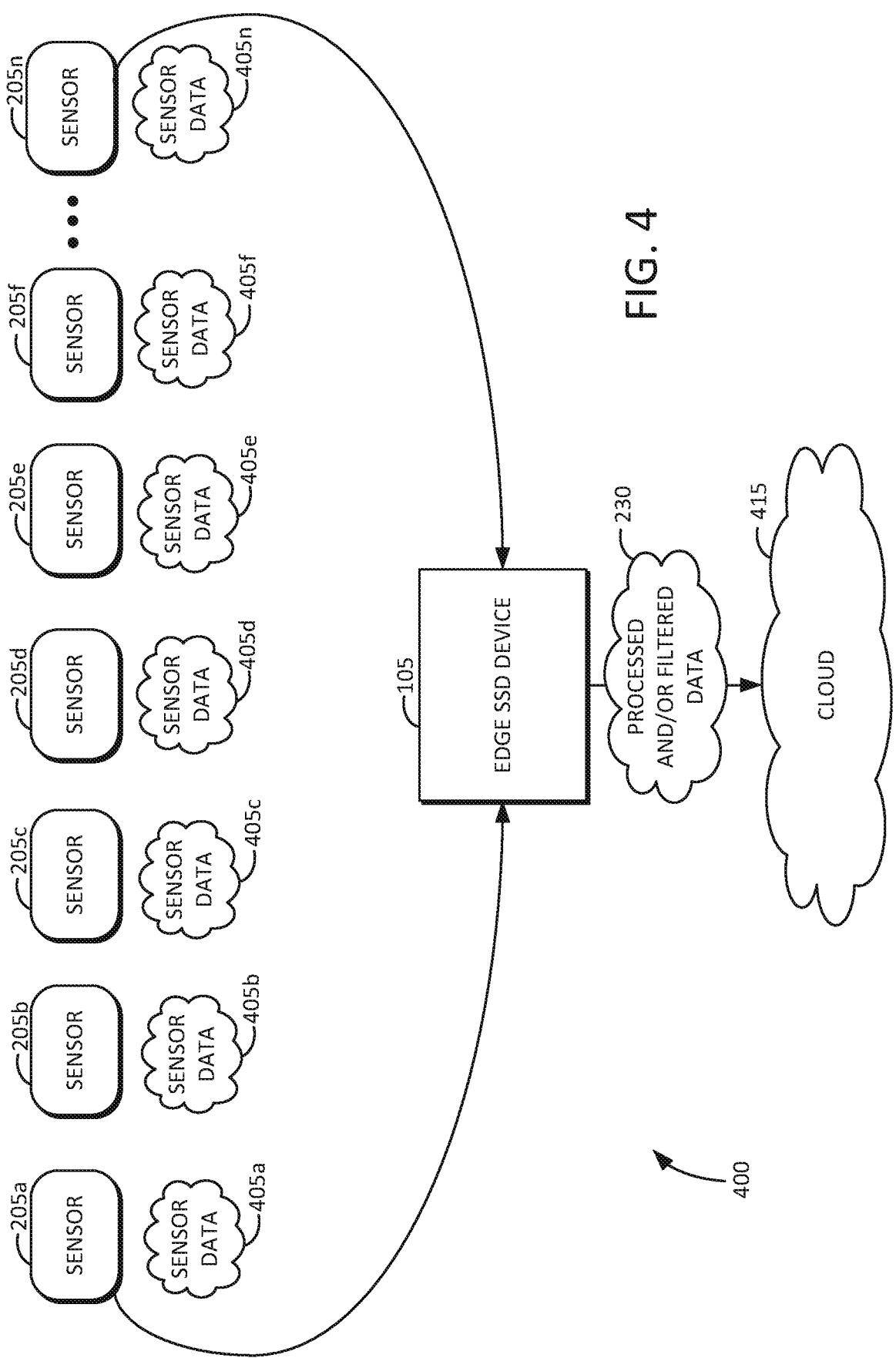
FIG. 4 illustrates a block diagram of another edge data system including the edge SSD device of FIG. 1 and various remote sensor devices and associated sensor data in accordance with some embodiments.

FIG. 4 illustrates a block diagram of another edge data system 400 including the edge SSD device 105 of FIG. 1 and various remote sensor devices (e.g., 205a through 205n) and associated sensor data (e.g., 405a through 405n), respectively, in accordance with some embodiments. The edge SSD device 105 may receive the sensor data (e.g., 405a through 405n) either directly from each of the remote sensor devices (e.g., 205a through 205n) or via a P2P network. The edge SSD device 105 may receive the sensor data (e.g., 405a through 405n) at a rate of between 1 gigabits/second (Gb/s) and 10 Gb/s, for example. The edge SSD device 105 may transmit the processed and/or filtered data 230 at a rate of 1 Gb/s or less to the cloud 415, for example. The data processor 125 (of FIG. 1) can cause the anomalous data 235 (of FIG. 2) to be transmitted using the one or more wireless transceivers (e.g., 190, 195, 198 of FIG. 1) to the cloud 415. The data processor 125 (of FIG. 1) can cause the statistical summary 240 (of FIG. 2) to be transmitted using the one or more wireless transceivers (e.g., 190, 195, 198 of FIG. 1) to the cloud 415.

The edge SSD device 105 can be used in connection with a variety of applications, such as edge computing, the IoT, home automation, networking, and in datacenters. For example, remote sensors (e.g., 205a through 205n) may be located in a data center, and the edge SSD device 105 can aggregate sensor data from various points within or near the data center. By way of another example, distributed file systems may receive processed and/or filtered data 230 from the edge SSD device 105, and may accelerate compute capabilities based on the processed and/or filtered data 230 provided by the edge SSD device 105. By way of yet another example, distributed networks may achieve accelerated hardware consensus based on the processed and/or filtered data 230 provided by the edge SSD device 105.

In addition, telecom applications may depend on the edge SSD device 105 for edge caching of local devices, such as connected sensor nodes. Instead of remote sensors, local data consumers may receive and use the processed and/or filtered data 230 provided by the edge SSD device 105. Accelerated processing may be achieved based on the processed and/or filtered data 230 provided by the edge SSD device 105. An application may more easily look up and find data to serve video streaming applications, for example. Edge databases may receive and use the processed and/or filtered data 230 provided by the edge SSD device 105. Self-describing documents and data formats may receive and use the processed and/or filtered data 230 provided by the edge SSD device 105.

Moreover, industrial automation applications including data control systems such as supervisory control and data acquisition (SCADA) may receive and use the processed and/or filtered data 230 provided by the edge SSD device 105. For industrial automation applications, decisions can be made closer to the edge of the network based on the processed and/or filtered data 230 provided by the edge SSD device 105. In addition, data for the industrial automation applications can be stored on the edge SSD device 105, and only important results filtered up a hierarchy of network nodes.

Figure 5:
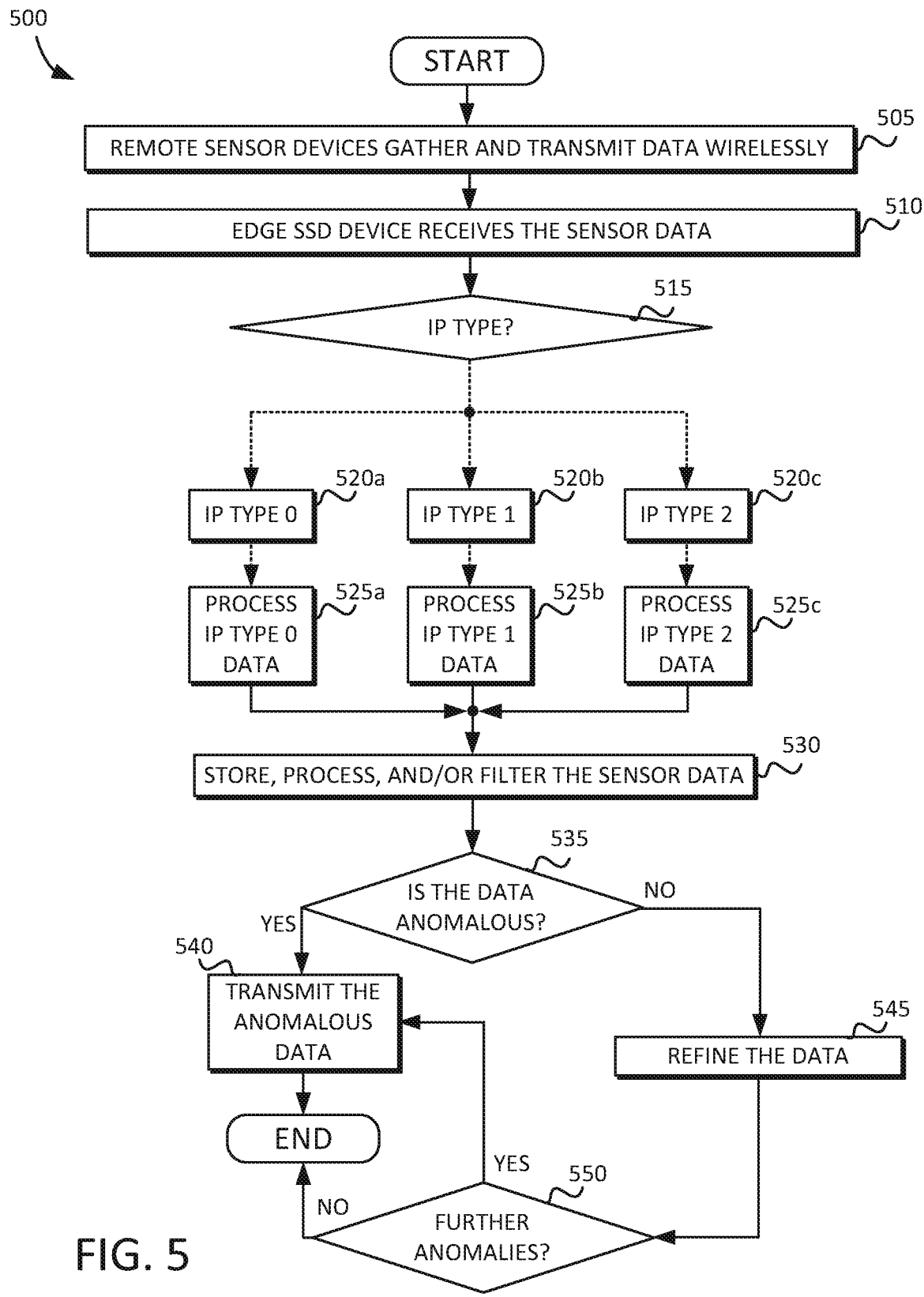
FIG. 5 is a flow diagram illustrating a technique for gathering, processing, and/or filtering edge data by finding anomalous data using an edge SSD device in accordance with some embodiments.

FIG. 5 is a flow diagram 500 illustrating a technique for gathering and filtering edge data by finding anomalous data (e.g., 235 of FIG. 2) using an edge SSD device 105 in accordance with some embodiments. Reference is now made to FIGS. 1 through 5.

At 505, the remote sensor devices (e.g., 205a through 205n of FIG. 2) may gather and transmit data wirelessly. At 510, the edge SSD device 105 may receive the sensor data 220. At 515, the edge SSD device 105 may determine an IP type of the sensor data 220. Based on the IP type of the sensor data 220 being type 0, the flow may proceed to 520a, and then to 525a, in which the IP type 0 data may be processed by the edge SSD device 105. Based on the IP type of the sensor data 220 being type 1, the flow may proceed to 520b, and then to 525b, in which the IP type 1 data may be processed by the edge SSD device 105. Based on the IP type of the sensor data 220 being type 2, the flow may proceed to 520c, and then to 525c, in which the IP type 2 data may be processed by the edge SSD device 105.

At 530, the sensor data 220 may be stored, processed, and/or filtered by the edge SSD device 105. At 535, the edge SSD device 105 may determine whether the sensor data 220 includes anomalous data 235. Based on determining that the sensor data 220 includes the anomalous data 235, the flow may proceed to 540, in which the anomalous data 235 may be transmitted to the cloud 415. Based on determining that the sensor data 220 does not include the anomalous data 235, the flow may proceed to 545, in which the sensor data 220 may be refined. At 550, the edge SSD device 105 may determine whether there are any further anomalies in the refined data. Based on determining that there are further anomalies, the flow may proceed to 540, in which the anomalous data 235 may be transmitted to the cloud 415. Based on the determining that there are no further anomalies, the flow may end.

Figure 6:
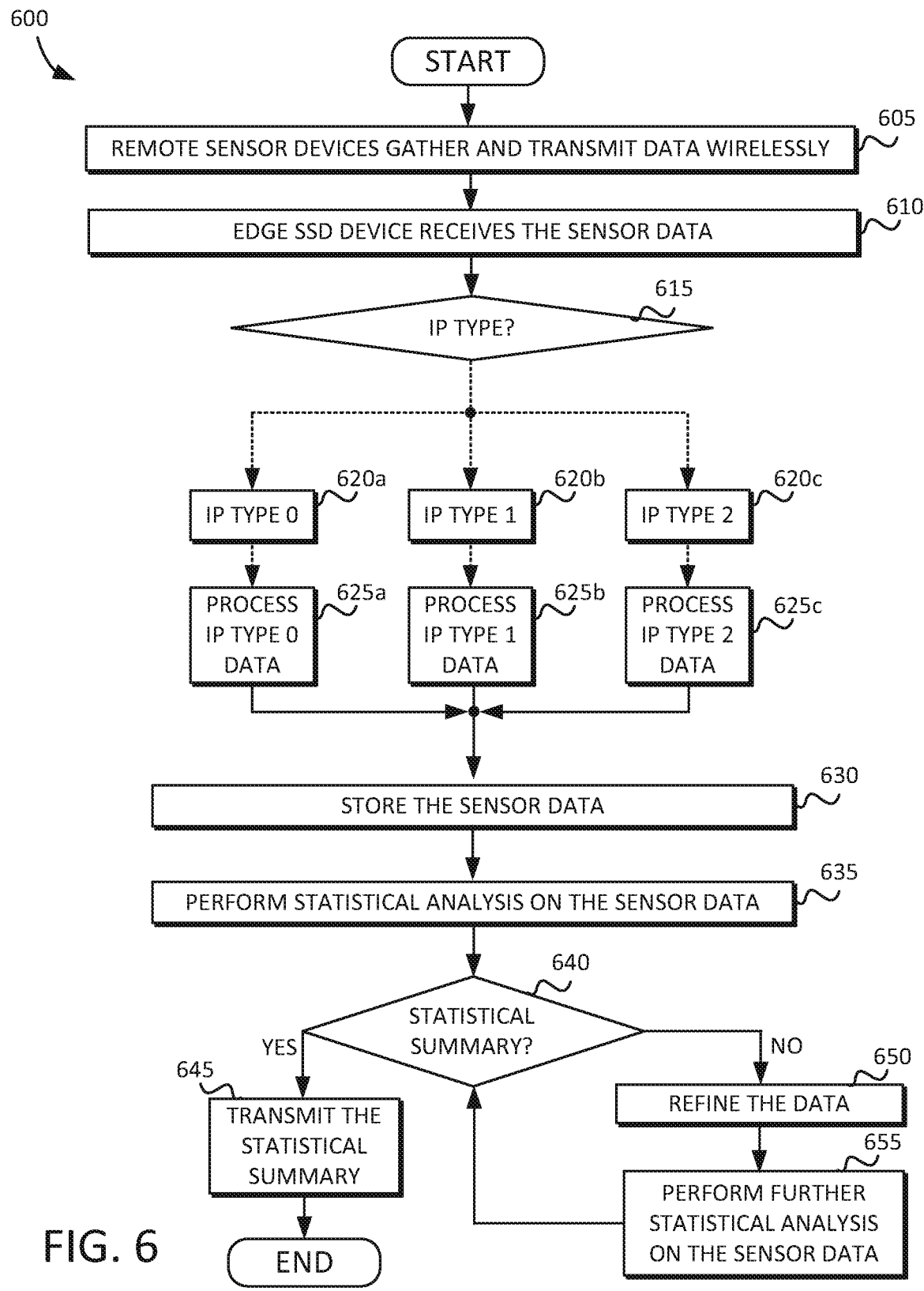
FIG. 6 is a flow diagram illustrating a technique for gathering, processing, and/or filtering edge data by performing statistical analysis using an edge SSD device in accordance with some embodiments.

FIG. 6 is a flow diagram 600 illustrating a technique for gathering, processing, and/or filtering edge data by performing statistical analysis using the edge SSD device 105 in accordance with some embodiments. Reference is now made to FIGS. 1 through 5, and 6.

At 605, remote the sensor devices (e.g., 205a through 205n of FIG. 2) may gather and transmit data wirelessly. At 610, the edge SSD device 105 may receive the sensor data 220. At 615, the edge SSD device 105 may determine an IP type of the sensor data 220. Based on the IP type of the sensor data 220 being type 0, the flow may proceed to 620a, and then to 625a, in which the IP type 0 data may be processed by the edge SSD device 105. Based on the IP type of the sensor data 220 being type 1, the flow may proceed to 620b, and then to 625b, in which the IP type 1 data may be processed by the edge SSD device 105. Based on the IP type of the sensor data 220 being type 2, the flow may proceed to 620c, and then to 625c, in which the IP type 2 data may be processed by the edge SSD device 105.

At 630, the sensor data 220 may be stored by the edge SSD device 105. At 635, the edge SSD device 150 may perform a statistical analysis on the sensor data 220. At 640, the edge SSD device 105 may determine whether a statistical summary 240 is complete. Based on determining that the statistical summary 240 is complete, the flow may proceed to 645, in which the statistical summary 240 may be transmitted to the cloud 415. Based on determining that the statistical summary 240 is not complete, the flow may proceed to 650, in which the sensor data 220 may be refined. At 655, the edge SSD device 105 may perform further statistical analysis on the sensor data 220, after which the flow may return to 640 to determine whether the statistical summary 240 is complete. Based on determining that the statistical summary 240 is complete at 640, the flow may proceed to 645, in which the statistical summary 240 may be transmitted to the cloud 415.

Figure 7:
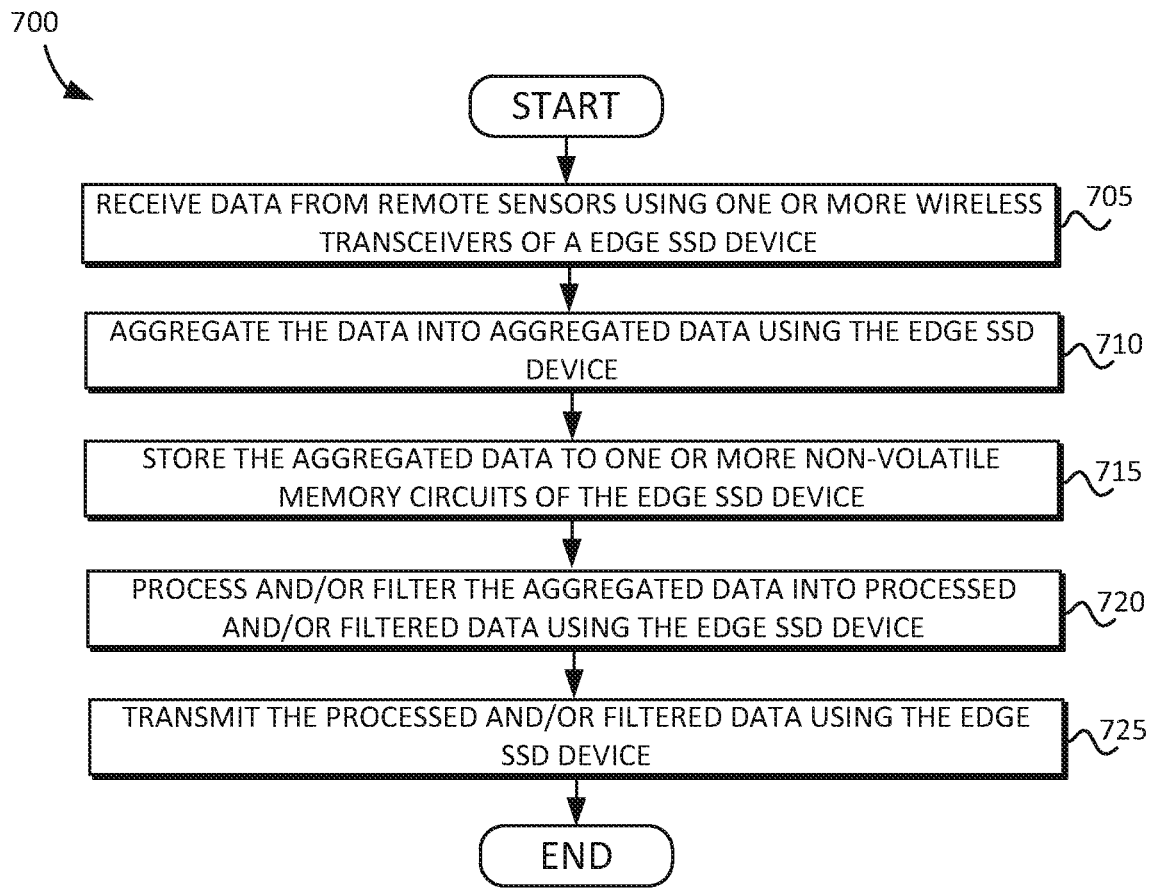
FIG. 7 is a flow diagram illustrating a technique for gathering, processing, and/or filtering edge data using an edge SSD device in accordance with some embodiments.

FIG. 7 is a flow diagram 700 illustrating a technique for gathering, processing, and/or filtering edge data using an edge SSD device in accordance with some embodiments. Reference is now made to FIGS. 1 through 5, and 7.

At 705, the edge SSD device 105 may receive data 220 from the remote sensors (e.g., 205a through 205n) using the one or more wireless transceivers (e.g., 190) of the edge SSD device 105. At 710, the edge SSD device 105 may aggregate the data 220 into aggregated data 225. At 715, the edge SSD device 105 may store the aggregated data 225 to one or more non-volatile memory circuits (e.g., 115) of the edge SSD device 105. At 720, the edge SSD device 105 may process and/or filter the aggregated data 225 into processed and/or filtered data 230. At 725, the edge SSD device 105 may transmit the processed and/or filtered data 230 using the one or more wireless transceivers (e.g., 905, 908) of the edge SSD device 105.

Figure 8:
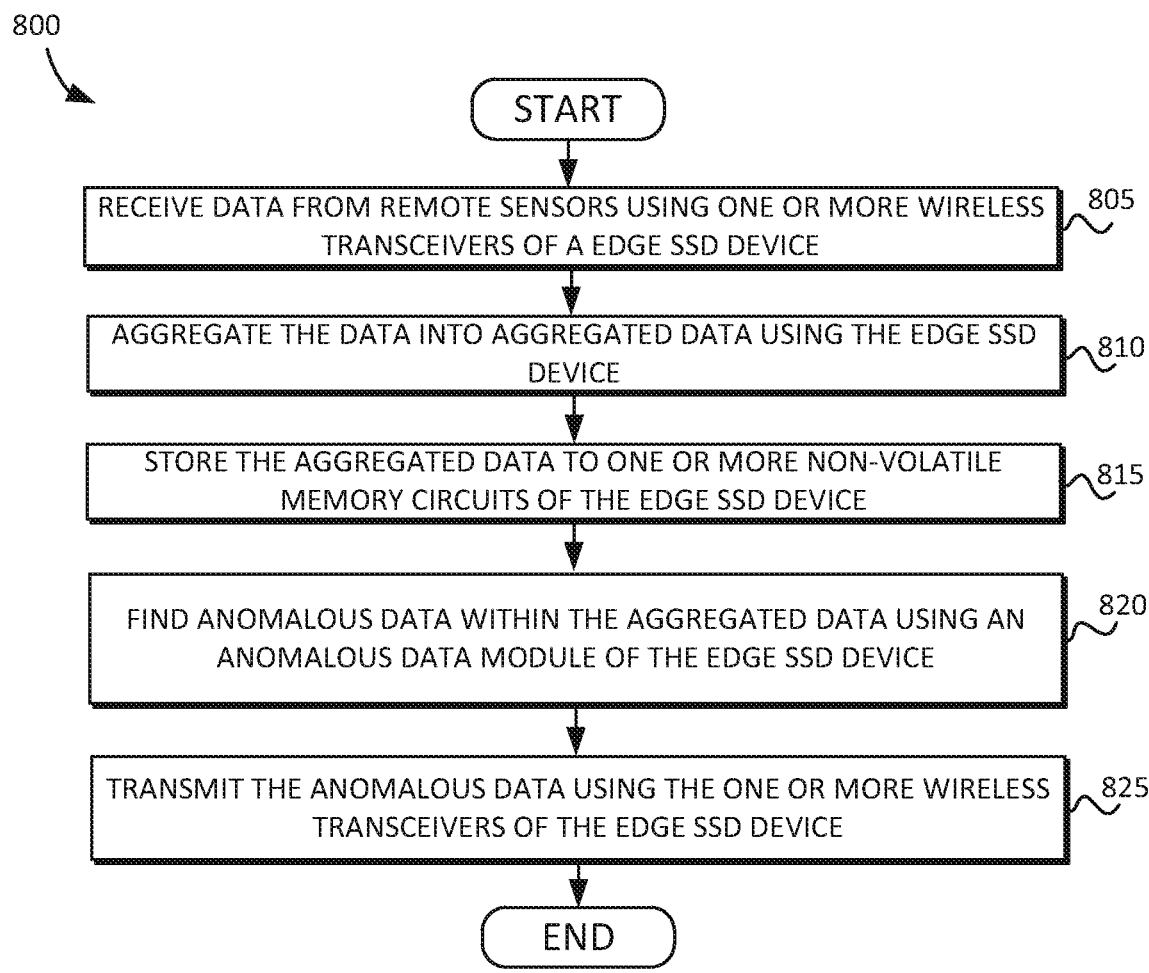
FIG. 8 is a flow diagram illustrating another technique for gathering, processing, and/or filtering edge data by finding anomalous data using an edge SSD device in accordance with some embodiments.

FIG. 8 is a flow diagram 800 illustrating another technique for gathering, processing, and/or filtering edge data by finding anomalous data using an edge SSD device in accordance with some embodiments. Reference is now made to FIGS. 1 through 5, and 8.

At 805, the edge SSD device 105 may receive data 220 from the remote sensors (e.g., 205a through 205n) using the one or more wireless transceivers (e.g., 190) of the edge SSD device 105. At 810, the edge SSD device 105 may aggregate the data 220 into aggregated data 225. At 815, the edge SSD device 105 may store the aggregated data 225 to one or more non-volatile memory circuits (e.g., 115) of the edge SSD device 105. At 820, the edge SSD device 105 may find anomalous data 235 within the aggregated data 225 using an anomalous data module 135 of the edge SSD device 105. At 825, the edge SSD device 105 may transmit the anomalous data 235 using the one or more wireless transceivers (e.g., 905, 908) of the edge SSD device 105.

Figure 9:
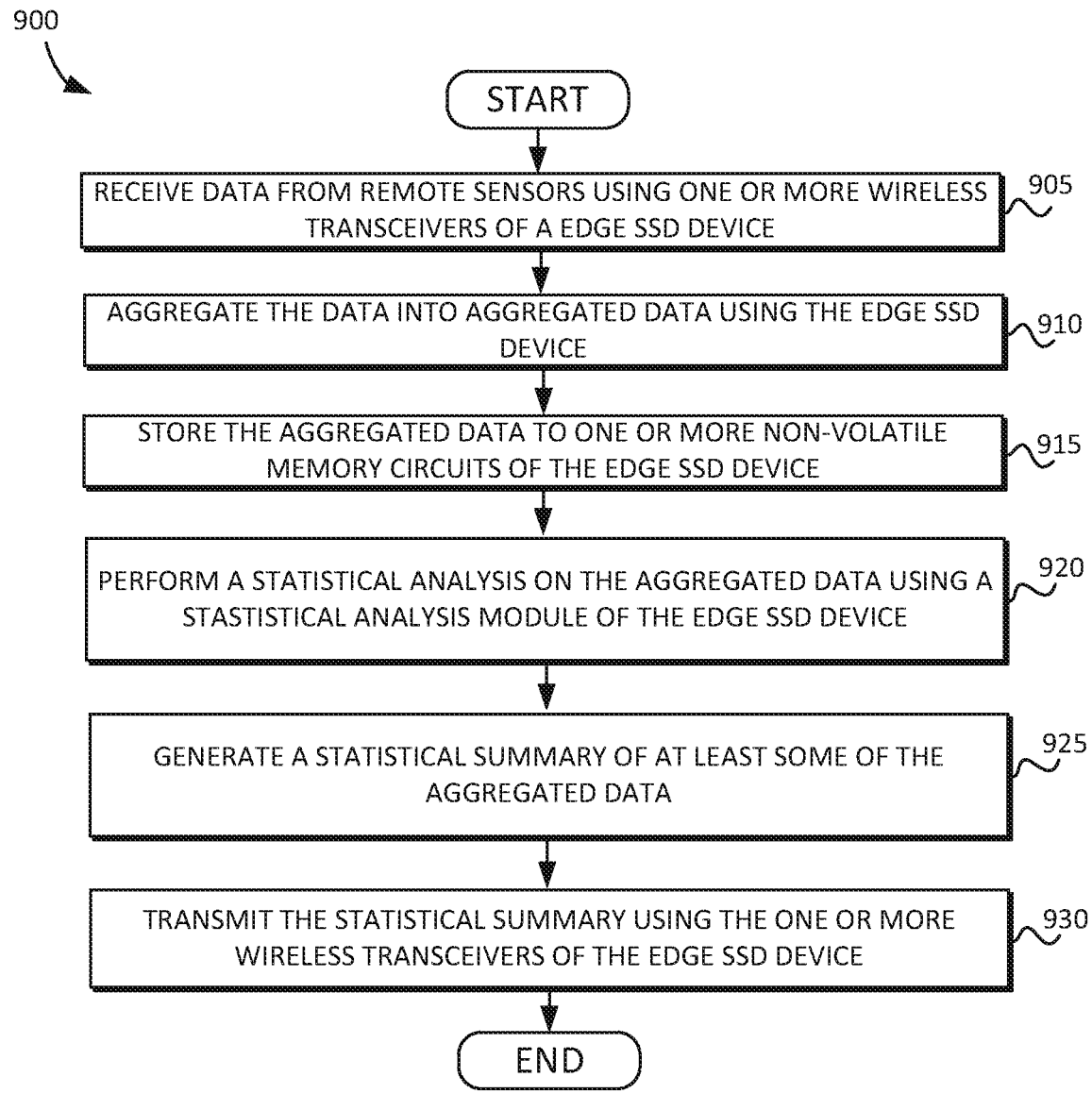
FIG. 9 is a flow diagram illustrating another technique for gathering, processing, and/or filtering edge data by performing statistical analysis using an edge SSD device in accordance with some embodiments.

FIG. 9 is a flow diagram 900 illustrating another technique for gathering, processing, and/or filtering edge data by performing statistical analysis using an edge SSD device in accordance with some embodiments. Reference is now made to FIGS. 1 through 5, and 9.

At 905, the edge SSD device 105 may receive data 220 from the remote sensors (e.g., 205a through 205n) using the one or more wireless transceivers (e.g., 190) of the edge SSD device 105. At 910, the edge SSD device 105 may aggregate the data 220 into aggregated data 225. At 915, the edge SSD device 105 may store the aggregated data 225 to one or more non-volatile memory circuits (e.g., 115) of the edge SSD device 105. At 920, the edge SSD device 105 may perform a statistical analysis on the aggregated data 225 using a statistical analysis module 130 of the edge SSD device 105. At 925, the edge SSD device 105 may generate a statistical summary 240 of the aggregated data 225. At 930, the edge SSD device 105 may transmit the statistical summary 240 using the one or more wireless transceivers (e.g., 905, 908) of the edge SSD device 105.

The various operations of methods described above may be performed by any suitable means capable of performing the operations, such as various hardware and/or software component(s), circuits, and/or module(s).

Some embodiments may include a standalone edge SSD device. The edge SSD device can include one or more non-volatile memory circuits. The edge SSD device can include one or more memory controllers configured to operate the one or more non-volatile memory circuits. The edge SSD device can include one or more wireless transceivers. The edge SSD device can include a data processor configured to aggregate data received from a first remote sensor device and a second remote sensor device using the one or more wireless transceivers into aggregated data. In some embodiments, the data processor may be further configured to process and/or filter the aggregated data into processed and/or filtered data, to cause the aggregated data to be stored by the one or more memory controllers to the one or more non-volatile memory circuits, and to cause the processed and/or filtered data to be transmitted using the one or more wireless transceivers.

In some embodiments, the data processor includes an anomalous data module configured to find anomalous data within the aggregated data. In some embodiments, the anomalous data includes at least one of erroneous data or data outside of a predefined set of parameters. In some embodiments, the anomalous data includes at least one of an image of a human face or an image of a particular object. In some embodiments, the data processor is configured to cause the anomalous data to be transmitted using the one or more wireless transceivers to a cloud, such as a datacenter. In some embodiments, the data processor includes a statistical analysis module configured to perform a statistical analysis on the aggregated data, and to generate a statistical summary of at least some of the aggregated data. In some embodiments, the data processor is configured to cause the statistical summary of the at least some of the aggregated data to be transmitted using the one or more wireless transceivers to a cloud, such as a datacenter. In some embodiments, the one or more wireless transceivers includes at least one of a WiFi radio transceiver or a cellular radio transceiver. In some embodiments, the one or more wireless transceivers includes two or more WiFi radio transceivers and two or more cellular radio transceivers.

The edge SSD device may include a communication module. The communication module may include the one or more transceivers including at least one of a WiFi radio transceiver or a cellular radio transceiver, an ethernet module including one or more ethernet ports, at least one of a 4G or 5G module, a transmission control protocol (TCP) module, a remote direct access memory (RDMA) module, and an Internet protocol (IP) module. The edge SSD device may include a system management bus configured to communicatively couple together the one or more memory controllers, the data processor, and the communication module.

In some embodiments, the WiFi radio transceiver is configured to receive the data from the first remote sensor device and the second remote sensor device, and the cellular radio transceiver is configured to transmit the processed and/or filtered data. In some embodiments, the WiFi radio transceiver is configured to receive the data from the first remote sensor device and the second remote sensor device, and the ethernet module is configured to cause the processed and/or filtered data to be transmitted over the one or more ethernet ports.

Some embodiments may include an edge data system. The edge data system may include a first remote sensor device configured to gather data of a first type. The edge data system a second remote sensor device configured to gather data of a second type different from the first type. The edge data system may include an edge SSD device. The edge SSD device may include one or more non-volatile memory circuits. The edge SSD device may include one or more memory controllers configured to operate the one or more non-volatile memory circuits. The edge SSD device may include one or more wireless transceivers. The edge SSD device may include a data processor configured to receive the data of the first type from the first remote sensor device using the one or more wireless transceivers, and to receive the data of the second type from the second remote sensor device using the one or more wireless transceivers. In some embodiments, the data processor may further be configured to aggregate the data of the first type and the data of the second type, to process and/or filter the aggregated data into processed and/or filtered data, to cause the aggregated data to be stored by the one or more memory controllers to the one or more non-volatile memory circuits, and to cause the processed and/or filtered data to be transmitted using the one or more wireless transceivers.

In some embodiments, the first remote sensor device includes a P2P module configured to receive and transmit data packets from at least the second remote sensor device. In some embodiments, the second remote sensor device includes a P2P module configured to receive and transmit data packets from at least the first remote sensor device. In some embodiments, the first remote sensor device is configured to transmit the data packets from the first remote sensor device and the second remote sensor device to the edge SSD device. In some embodiments, the first remote sensor device includes at least one of a camera, an accelerometer, a wind speed sensor, a temperature sensor, or a motion sensor. In some embodiments, the second remote sensor device includes at least one of a humidity sensor, a water sensor, or other sensor.

In some embodiments, the data processor includes an anomalous data module configured to find anomalous data within the aggregated data. In some embodiments, the anomalous data includes at least one of erroneous data or data outside of a predefined set of parameters. In some embodiments, the data processor is configured to cause the anomalous data to be transmitted using the one or more wireless transceivers to a cloud, such as a datacenter.

In some embodiments, the data processor includes a statistical analysis module configured to perform a statistical analysis on the aggregated data, and to generate a statistical summary of at least some of the aggregated data. In some embodiments, the data processor is configured to cause the statistical summary of the at least some of the aggregated data to be transmitted using the one or more wireless transceivers to a cloud, such as a datacenter.

Some embodiments may include a computer-implemented method for gathering, processing, and/or filtering edge data. The method may include controlling, by one or more memory controllers, one or more non-volatile memory circuits of an edge solid state drive (SSD) device. The method may include receiving, by one or more wireless transceivers of the edge SSD device, data from a first remote sensor device and a second remote sensor device. The method may include aggregating, by the edge SSD device, the data from the first remote sensor device and the second remote sensor device into aggregated data. The method may include storing, by the one or more memory controllers, the aggregated data to the one or more non-volatile memory circuits. The method may include processing and/or filtering, by the edge SSD device, the aggregated data into processed and/or filtered data. The method may include transmitting, by the edge SSD device, the processed and/or filtered data.

The method may include finding, by an anomalous data module of the edge SSD device, anomalous data within the aggregated data, wherein the anomalous data includes at least one of erroneous data or data outside of a predefined set of parameters. Transmitting may include sending, by the edge SSD device using the one or more wireless transceivers, the anomalous data to a cloud, such as a datacenter.

The method may include performing, by a statistical analysis module of the edge SSD device, a statistical analysis on the aggregated data. The method may include generating, by the statistical analysis module, a statistical summary of at least some of the aggregated data. Transmitting may include sending, by the edge SSD device using the one or more wireless transceivers, the statistical analysis to a cloud, such as a datacenter. In some embodiments, processing may include adding, by the edge SSD device, a first value and a second value from among the aggregated data into summed data. The method may include transmitting, by the edge SSD device, the summed data.

The blocks or steps of a method or algorithm and functions described in connection with the embodiments disclosed herein may be embodied directly in hardware, in a software module executed by a processor, or in a combination of the two. Modules may include hardware, software, firmware, or any combination thereof. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed is:

1. An edge storage device, wherein the edge storage device is installed in at least one of a computing or storage device, wherein the edge storage device is configured to store data for the at least one of a computing or storage device, wherein the edge storage device is powered by the at least one of a computing or storage device; the edge storage device comprising:
    one or more non-volatile memory circuits;
    one or more memory controllers configured to operate the one or more non-volatile memory circuits;
    one or more first transceivers, wherein the one or more first transceivers comprise one or more wireless transceivers;
    one or more second transceivers, wherein the one or more second transceivers comprise one or more cellular transceivers; and
    a data processor configured to perform operations comprising:
        receiving sensor data from a first device and a second device using the one or more first transceivers, wherein the first device comprises a first sensor deployed at an edge of an Internet of things (IOT) network, and wherein the second device comprises a second sensor deployed at the edge of the IOT network;
        determining a protocol type of the sensor data;
        processing the sensor data based on the protocol type to generate processed data;
        storing the processed data on the one or more non-volatile memory circuits;
        performing, using at least one of an anomalous data module or a statistical analysis module, at least one of a determination that the processed data includes anomalous data or a statistical analysis on the processed data to generate summary data;
        determining to perform processing on the summary data based on a status of the summary data;
        processing the summary data;
        storing the summary data on the one or more non-volatile memory circuits; and
        transmitting the summary data using the one or more second transceivers, wherein a size of the summary data is smaller than a size of the processed data;
    wherein the edge storage device is deployed at the edge of the IOT network; and
    wherein the processed data and summary data are preserved for additional processing.

2. The edge storage device of claim 1, wherein the determination that the processed data includes anomalous data comprises finding anomalous data within the processed data, wherein the anomalous data comprises at least one of i) a portion of the processed data determined to be erroneous based on a predefined condition, and ii) data having values outside of a predefined set of parameters, and wherein transmitting the processed data comprises transmitting the anomalous data.

3. The edge storage device of claim 2, wherein the anomalous data includes an image of a human face.

4. The edge storage device of claim 1, wherein transmitting the summary data comprises transmitting the summary data using the one or more second transceivers to a datacenter.

5. The edge storage device of claim 1, wherein the data processor comprises the statistical analysis module configured to perform a statistical analysis on the processed data, and wherein the summary data comprises a statistical summary of at least some of the processed data.

6. The edge storage device of claim 1, wherein the data processor includes a third-party instruction module configured to receive one or more instructions from a third-party, wherein the one or more instructions relate at least one of i) processing the processed data, ii) preserving the processed data, iii) providing anomalous data associated with the processed data, and iv) performing a data transformation on the processed data resulting in a reduction in data transmission.

7. The edge storage device of claim 1, wherein the one or more first transceivers includes two or more WiFi radio transceivers and the one or more second transceivers includes one or more cellular radio transceivers.

8. The edge storage device of claim 1, further comprising:
a communication module, comprising:
the one or more first transceivers configured to communicate with the first device and the second device, and the one or more second transceivers configured to communicate with the Internet;
an ethernet module including one or more ethernet ports;
a wireless long term evolution (LTE) module;
a transmission control protocol (TCP) module;
a remote direct access memory (RDMA) module; and
an Internet protocol (IP) module;
a system management bus configured to communicatively couple together the one or more memory controllers, the data processor, and the communication module, wherein the data processor is configured to cause the processed data to be transmitted using the one or more second transceivers to a datacenter; and
an edge storage device connector configured to be connected to a host device that is separate from the edge storage device connector, wherein the edge storage device connector is a physical connector;
wherein the edge storage device connector is physically detachable from the host device;
wherein the first device is separate from and spaced apart from the edge storage device;
wherein the data processor includes a statistical analysis module configured to perform a statistical analysis on the processed data, and to generate a statistical summary of at least some of the processed data;
wherein the data processor is configured to cause the statistical summary of the at least some of the processed data to be transmitted using the one or more second transceivers to the datacenter;
wherein the data processor includes a third-party instruction module configured to receive one or more instructions from a third-party; and
wherein the one or more instructions relate to one or more of i) processing the processed data, ii) preserving the processed data, iii) providing anomalous data associated with the processed data, and iv) performing a data transformation on the processed data resulting in a reduction in data transmission.

9. The edge storage device of claim 8, wherein the one or more first transceivers is configured to receive the data from the first device and the second device, and the one or more second transceivers is configured to transmit the processed data.

10. The edge storage device of claim 8, wherein the one or more first transceivers is configured to receive the data from the first device and the second device, and the ethernet module is configured to cause the processed data to be transmitted over the one or more ethernet ports.

11. The edge storage device of claim 1, wherein the data received from the first device comprises a first type of data, and the data received from the second device comprises a second type of data, and wherein the first type of data is processed by a different process from the second type of data.

12. The edge storage device of claim 11, wherein the first type of data comprises a first IP type; and
wherein the second type of data comprises a second IP type different from the first IP type.

13. The edge storage device of claim 1, wherein the edge storage device comprises an edge storage device connector, wherein the edge storage device connector is a physical connector configured to be directly connected to a host device that is separate from the edge storage device connector.

14. The edge storage device of claim 13, wherein the edge storage device connector is physically detachable from the host device; and
wherein the first device is separate from and spaced apart from the edge storage device.

15. A data processing system, comprising:
a first device configured to gather data of a first type;
a second device configured to gather data of a second type different from the first type; and an edge storage device, wherein the edge storage device is installed in at least one of a computing or storage device, wherein the edge storage device is configured to store data for the at least one of a computing or storage device, wherein the edge storage device is powered by the at least one of a computing or storage device, the edge storage device comprising:
one or more non-volatile memory circuits;
one or more memory controllers configured to operate the one or more non-volatile memory circuits;
one or more first transceivers of a first type, wherein the one or more first transceivers comprises one or more wireless transceivers;
one or more second transceivers of a second type, wherein the one or more second transceivers comprises one or more cellular transceivers; and
a data processor configured to perform operations comprising:
receiving the data of the first type from the first device using the one or more first transceivers;
receiving the data of the second type from the second device using the one or more first transceivers, wherein the first device is a first sensor deployed at the edge of an Internet of things (IOT) network, and wherein the second device is a second sensor deployed at the edge of the IOT network;
receiving instructions from a third-party module;

processing the data of the first type and the data of the second type to generate processed data based on the instructions from the third-party module;

causing the processed data to be stored by the one or more memory controllers on the one or more non-volatile memory circuits;

performing, using at least one of an anomalous data module or a statistical analysis module, at least one of a determination that the processed data includes anomalous data or a statistical analysis on the processed data to generate summary data;

determining to perform processing on the summary data based on a status of the summary data;

processing the summary data based on the instructions from the third-party module;

storing the summary data on the one or more non-volatile memory circuits; and causing the summary data to be transmitted using the one or more second transceivers, wherein a size of the summary data is smaller than a size of the processed data;

wherein the data processor comprises an anomalous data module configured to find anomalous data within the processed data, and the anomalous data includes an anomalous frame within a series of images;

wherein the data processor is configured to cause a subset of the series of images to be transmitted using the one or more second transceivers;

wherein the subset includes the anomalous frame; and wherein the edge storage device is configured to be deployed at an edge of a network.

16. The data processing system of claim 15, wherein:
the first device includes a peer to peer (P2P) module configured to receive and transmit data packets from at least the second device;
wherein the second device comprises a P2P module configured to receive and transmit data packets from at least the first device;
wherein the first device is configured to perform at least one of i) transmitting the data packets directly to the edge storage device and ii) determining a routing path through the second device to communicate with the edge storage device; and
wherein the second device is configured to perform at least one of i) transmitting the data packets directly to the edge storage device and ii) determining a routing path through the first device to communicate with the edge storage device.

17. The data processing system of claim 15, wherein:
the first device includes at least one of a camera, an accelerometer, a wind speed sensor, a temperature sensor, and a motion sensor; and
the second device includes at least one of a humidity sensor, a water sensor, and other sensor.

18. The data processing system of claim 15, wherein:
the anomalous data comprises at least one of erroneous data and data outside of a predefined set of parameters; and
the data processor is configured to cause the anomalous data to be transmitted using the one or more second transceivers to a datacenter.

19. The data processing system of claim 15, wherein:
the data processor comprises a statistical analysis module configured to perform a statistical analysis on the processed data, and to generate a statistical summary of at least some of the processed data;
wherein the data processor is configured to cause the statistical summary of the at least some of the processed data to be transmitted using the one or more second transceivers to a datacenter.

20. A method for gathering and processing data, the method comprising:
controlling, by one or more memory controllers that are disposed within an edge storage device, one or more non-volatile memory circuits of the edge storage device, wherein the edge storage device is installed in at least one of a computing or storage device, wherein the edge storage device is configured to store data for the at least one of a computing or storage device, wherein the edge storage device is powered by the at least one of a computing or storage device;

receiving, at the edge storage device, by one or more first transceivers of a first type, sensor data from a first device and a second device wherein the one or more first transceivers comprise one or more wireless transceivers;

determining, by a data processor, a protocol type of the sensor data;

processing the sensor data based on the protocol type to generate processed data;

storing, by the one or more memory controllers, the processed data on the one or more non-volatile memory circuits;

performing, using at least one of an anomalous data module or a statistical analysis module, at least one of a determination that the processed data includes anomalous data or a statistical analysis on the processed data to generate summary data;

determining to perform processing on the summary data based on a status of the summary data;

processing the summary data;

storing the summary data on the one or more non-volatile memory circuits;

transmitting, from the edge storage device, using one or more second transceivers of a second type, at least a portion of the summary data to a datacenter; and deploying the edge storage device at an edge of an Internet of things (IOT) network, wherein the first device is a first sensor deployed at the edge of the IOT network;

wherein the second device is a second sensor deployed at the edge of the IOT network;

wherein the one or more second transceivers comprise one or more cellular transceivers including a second antenna that are disposed within the edge storage device;

wherein the processed data and summary data are preserved for additional processing.

* * * * *